United States Patent [19]

Bauer

[11] 4,339,038
[45] Jul. 13, 1982

[54] REINFORCED FLEXIBLE X-RAY FILM CASSETTE

[75] Inventor: Walter Bauer, Munich, Fed. Rep. of Germany

[73] Assignee: AGFA-Gevaert Aktiengesellschaft, Leverkusen, Fed. Rep. of Germany

[21] Appl. No.: 142,086

[22] Filed: Apr. 21, 1980

[30] Foreign Application Priority Data

Apr. 30, 1979 [DE] Fed. Rep. of Germany ....... 2917546

[51] Int. Cl.³ .............................................. G03B 41/16
[52] U.S. Cl. .................................... 206/455; 220/334; 250/480; 250/481; 250/482
[58] Field of Search ................ 206/455, 449; 250/480, 250/481, 482; 220/334, 355

[56] References Cited

U.S. PATENT DOCUMENTS

| | | | |
|---|---|---|---|
| 2,590,891 | 5/1952 | Reuter | 250/480 |
| 3,317,078 | 5/1967 | Gordon | 220/342 |
| 3,441,128 | 4/1969 | Goldberg | 220/334 X |
| 3,504,180 | 3/1970 | Tone | 250/482 X |
| 3,949,872 | 4/1976 | Paudras | 220/334 |
| 4,081,686 | 3/1978 | Nieweboer | 250/480 |
| 4,157,474 | 6/1979 | Koontz et al. | 250/480 |
| 4,264,821 | 4/1981 | Bauer | 250/481 X |

*Primary Examiner*—Steven M. Pollard

*Attorney, Agent, or Firm*—Kontler, Grimes & Battersby

[57] ABSTRACT

A reinforced flexible x-ray film cassette includes two cassette parts which are connected at one side by a hinge and which are cylindrically curved as considered in a plane normal to the hinge. Two circumferentially extending ribs are provided on one of the cassette parts and a single circumferentially extending rib is provided on the other cassette part, the single rib being received between the two ribs in the closed position of the cassette to form a light barrier therewith and being in force-transmitting engagement therewith to reinforce the cassette against bending or twisting. The cassette part which constitutes the bottom includes a foil of ferromagnetic material floatingly supported on an elastic peripheral strip and an intensifying shield supported on this foil. The cassette part which constitutes the top includes a magnetic plate supported on elongated projections of the cassette wall and supporting another intensifying shield. In the closed position of the cassette, the magnetic plate attracts the ferromagnetic foil to thereby eliminate air inclusions between the intensifying shields and the x-ray film interposed therebetween. The hinge includes two rails interconnected by a flexible, part-cylindrical connecting portion. Each of the rails of the hinge has a recess which receives a correspondingly configurated projection of the frame of the respective cassette part.

30 Claims, 2 Drawing Figures

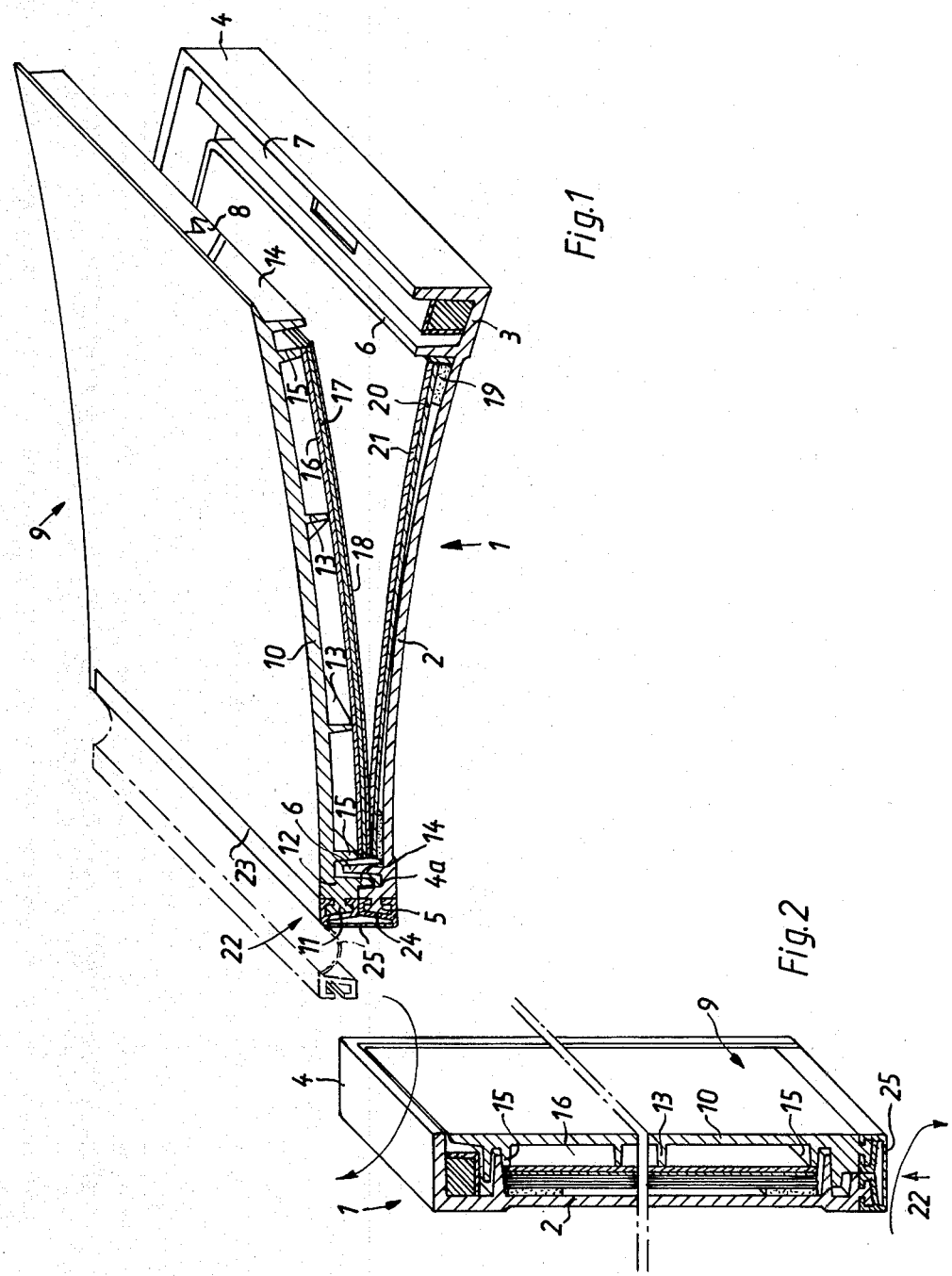

REINFORCED FLEXIBLE X-RAY FILM CASSETTE

BACKGROUND OF THE INVENTION

The present invention relates to film cassettes in general, and more particularly to film cassettes for x-ray films. Still more particularly, the present invention relates to film cassettes of synthetic plastic material including two elastically deformable and cylindrically pre-deformed cassette parts which are connected with one another by a hinge, at least one of which is permeable to x-rays, and which are held in their closed position by a latching mechanism.

Film cassettes of this type are already known, for instance, from the German application DE-OS No. 1772040. The cassette disclosed in this publication includes curved aluminum plates which are supported in a frame of synthetic plastic material. It is also contemplated in this publication to use certain synthetic plastic materials for the aforementioned plates, instead of aluminum. The pre-curved plates serve to expel air from the spaces between intensifying shields and the film received therebetween in the course of closing the cassette. In the absence of expulsion of air inclusions, such air inclusions would interrupt the contact of the film with the respective intensifying shield at the location of the air inclusion and this, in turn, would result in foggy or blurred zones of the image formed on the film. A considerable disadvantage of this known x-ray film cassette is that this cassette can be easily bent, twisted or otherwise deformed.

More particularly, owing to the use of the flexible frame of synthetic plastic material in this cassette, the latter would deviate from a plane, for instance, when it is displaced at one of its corners by three to four centimeters. It is also easy to twist or otherwise distort the closed cassette. This problem can be, at least theoretically, overcome by increasing the wall thickness of the two parts of the cassette. However, this is not feasible for reasons of high expenses, high weight, and high x-ray absorption.

OBJECTS AND SUMMARY OF THE INVENTION

Accordingly, it is a general object of the present invention to avoid the disadvantages of the prior art.

More particularly, it is an object of the present invention to provide an x-ray film cassette which is not possessed of the disadvantages of the conventional cassettes of this type. Still another object of the present invention is to so construct the x-ray film cassette as to be able to withstand, in its closed position, normal loads to which it is subjected during its handling, substantially without deviating from its planar configuration.

A concomitant object of the present invention is to so construct the x-ray film cassette of the type here under consideration as to be simple in construction, easy and inexpensive to manufacture, and reliable in operation nevertheless.

In pursuance of these objects and others which will become apparent hereafter, one feature of the present invention resides in a film cassette, especially for x-ray films, which, briefly stated, comprises two cassette parts; hinge means connecting the cassette parts to one another for displacement between an open and a closed position; and means for delimiting a film-accommodating space in the closed cassette, including cooperating ribs on the cassette parts, these ribs circumferentially bounding the aforementioned space and overlapping one another in the closed position of the cassette. Advantageously, the ribs of the two cassette parts engage one another and are in force-transmitting contact with each other in the closed position of the cassette. It is further advantageous when the ribs extend along rectangular courses around the space and are circumferentially complete. It is particularly advantageous when at least one of the ribs is provided on one of the cassette parts and at least two of the ribs are provided on the other of the cassette parts, in such relative positions that the one rib of the one cassette part is received between the two ribs of the other cassette part in the closed position of the cassette.

When the film cassette is constructed in the above discussed manner, especially with the overlapping, mutually engaging ribs arranged in the vicinity of the frame of the cassette, which ribs simultaneously serve as a light barrier, it is achieved that the film cassette has a sufficiently high resistance to bending and twisting in its closed position, as a result of the mutual support of the ribs of the two cassette parts. Owing to this high resistance to bending or torsional stresses, this cassette is also suited for use in a system for feeding and withdrawing the x-ray film. By resorting to the present invention, it is further possible to make the cassette walls thinner than before, as a result of which the weight and manufacturing costs of the cassette are further reduced.

According to a further concept of the present invention, the wall of one of the cassette parts is constructed as a sandwich structure in which two thin plates of synthetic plastic material are connected to one another by support ribs or projections. By constructing this cassette wall in this manner, it is possible, on the one hand, to increase the resistance thereof to distortion and, on the other hand, to further reduce the total thickness of the synthetic plastic material layer so as to further lower the consumption of the material.

In accordance with a further aspect of the present invention, there is provided a system for bringing the intensifying shield in contact with the x-ray film, in which the contacting action is accomplished independently of the cassette walls, especially in view of the relatively small thickness of the latter. In this system, there is provided a magnetic plate immovably mounted on one of the cassette walls and a thin ferromagnetic foil floatingly supported on the other cassette wall in opposite relationship to the magnetic plate in the closed position of the cassette. The intensifying shields and the x-ray film are positioned between the magnetic plate and the foil, and they are pressed against one another by the magnetic attraction taking place between the magnetic plate and the ferromagnetic foil.

The novel features which are considered as characteristic of the invention are set forth in particular in the appended claims. The improved x-ray film cassette itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a fragment of a partially open cassette according to the invention; and FIG. 2 is a perspective fragmentary view of the cassette of FIG. 1 in its closed position.

DETAILED DESCRIPTION OF THE PREFERRED EMBODIMENT

Referring now to the drawing in detail, and first to FIG. 1 thereof, it may be seen that the reference numeral 1 has been used herein to identify a bottom part of the cassette according to the present invention. The bottom part or cassette bottom 1 includes a cassette wall 2, and a frame 3 which circumferentially surrounds the cassette wall 2 and includes a ridge 4 which is provided at three sides or outer marginal zones of the frame 3. A projection or ridge 4a is provided at the fourth marginal zone or edge of the frame 3, the height of the ridge 4a being smaller than that of the ridge 4. The ridge 4a is formed, at its externally facing surface, with a T-shaped rail 5. In addition thereto, there is formed on the cassette bottom 1, at a small distance from the ridges 4 and 4a, a circumferentially extending rib 6 which substantially surrounds a space for accommodating the x-ray film and which forms a part of a light barrier. A closing latch 7 is provided at that side of cassette bottom 1 which is situated remotely from the side provided with the ridge 4a, the closing latch 7 being accommodated between the ridge 4 and the rib 6 and co-operating with a hook 8 provided on a top part 9 of the cassette.

The top part or cassette top 9 is substantially of a sandwich construction and includes a cassette wall 10 on which there is provided, at the side which is to be connected to a hinge 22, a ridge 12 which is also formed with a T-shaped rail 11. Elongated diagonally extending projections 13 are provided at the inner surface of the cassette wall 10, and so are two circumferentially extending ribs 14 and 15 arranged at the periphery of the cassette wall 10. The ribs 14 and 15 constitute further parts of the light barrier and are so constructed and arranged that they embrace the rib 6 of the cassette bottom 1. In order to assure that the ribs 6, 14 and 15, which together form the light barrier, engage one another in the closed position of the cassette in a form-locking or a force-transmitting contact with one another and, in addition thereto, that the cassette top 1 and the cassette bottom 9 can be pivotally brought together about the side carrying the hinge 22, these ribs 6, 14, and 15 have surfaces which are inclined in the direction from the walls 2 and 10 to the end faces thereof. The inclination of these surfaces is approximately between 1° and 3° at the sides, and approximately between 2° and 5° at that side which carries the hinge 22. In this manner, it is assured that the ribs 6, 14 and 15, which constitute the light barrier, support one another in the closed position of the cassette and prevent twisting or bending deformation of the cassette when the latter is subjected to forces which would otherwise cause bending or twisting thereof.

The projections 13 and the inner rib 15 on the cassette wall 10 have the same height as measured from the cassette wall 10 and they carry at their end faces a thin plate 16 of synthetic plastic material. The synthetic plastic material plate 16 is advantageously connected to projections 13 and to the ribs 15 by frictional welding bonds. When the cassette top 9 is constructed in this manner as a sandwich structure including the synthetic plastic material wall 10 and the synthetic plastic material plate 16, there are achieved, on the one hand, low thicknesses and thus low weights of the components constituting the cassette top 9 and, on the other hand, a high resistance of the cassette top 9 to a deformation due to external forces acting thereon.

A magnetic plate 17 is affixed to the inwardly facing surface of the synthetic plastic material plate 16. An intensifying shield 18 is supported on this magnetic plate 17. The magnetic plate 17 is a plate having multiple poles at least at one of its sides, or a flat piece which is equipped with a plurality of magnetized strips or regions having multiple poles. The synthetic plastic material plate 16, the magnetic plate 17 and the intensifying shield 18 all have approximately the same size which corresponds to or exceeds that of the film to be accommodated in the cassette. However, the plates 16 and 17 and the shield 18 do not extend outwardly beyond the inner rib 15.

A narrow elastic band 19 of a material permeable to x-rays, preferably of a foamed material, is provided at the wall 2 of the cassette bottom 1. The band or strip 19 is connected to the cassette wall 2 and extends along the rib 6 and within the space of rectangular configuration which is surrounded by the rib 6. A thin foil 20 of ferromagnetic material is connected to the elastic strip 19, and an additional intensifying shield 21 is connected to the inwardly facing surface of the foil 20. Both the foil 20 and the additional intensifying shield 21 have a size which approximately corresponds to that of the intensifying shield 18.

The cassette walls 2 and 10 have, in their original condition which corresponds to the open position of the cassette, a slight cylindrical pre-deformation or, in other words, these cassette walls 2 and 10 are slightly cylindrically curved when viewed from the side of the cassette carrying the hinge 22 to the opposite side while the cassette is in its open position. The convex sides of these curvatures face one another as the cassette parts 1 and 9 approach the closed position of the cassette. While the synthetic plastic material plate 16, the magnetic plate 17, and the intensifying shield 18 participate in this curving of the wall 10 in the open position of the cassette, the foil 20 and the additional intensifying shield 21 remain in an approximately planar condition as a result of the floating support of the foil 20 on the strip 19. In order to reinforce the relatively thin cassette wall 2 of the cassette bottom 1, this wall 2 can also have a spherical curvature which is oriented toward the cassette lid 9.

The cassette top 1 and the cassette bottom 9 are connected to one another by the aforementioned hinge 22 which, generally speaking, includes two elongated rails 23 and 24 of rectangular cross section which are connected to one another by a flexible band 25 which is also cylindrically pre-deformed. Each of the rails 23 and 24 is provided, at one of its longitudinally extending surfaces, with a groove or recess having a cross-sectional configuration compatible with or identical to the cross-sectional contour of the T-shaped projections of rails 5 and 11 on the cassette parts 1 and 9. The flexible band 25 which is connected to the rails 23 and 24 at their sides which are opposite to those provided with the recesses or grooves, has a tendency to move the rails 23 and 24 from the mutually adjacent position illustrated in full lines in FIG. 1 into the position which is indicated in FIG. 1 in phantom lines, in which position the recesses in the rails 23 and 24 face in opposite directions. This pretensioning of the elastic or flexible band 25 enhances the tendency of the cassette to assume its open position after the latching means 7, 8 has been disengaged, which tendency exists in any event as a result of the cylindrical pre-deformation of the walls 2 and 10.

Such an automatic movement of the cassette parts 1 and 9 and of their walls 2 and 10 away from one another after the release of the latching means 7, 8 has the advantage that the cassette can be handled in a simple manner by automatic feeding and withdrawing arrangements for the cassettes, in which arrangements the x-ray film is introduced into or withdrawn from the space bounded by the ribs 6, 14 and 15. In addition thereto, it is highly advantageous, considering the magnetic interaction between the magnetic plate 17 and the foil 20, when the cassette parts 1, 9 do not move away from one another in directions substantially normal thereto, but when they peel off from one another in accordance with their cylindrical pre-deformation.

A thin steel foil having a thickness of approximately 0.01 to 0.05 millimeters, preferably of 0.02 millimeters, can be used, for instance, for the foil 20. As a result of the minute thickness of this foil 20, the absorption of the x-rays is significantly reduced as compared to that encountered in conventional cassettes.

The magnetic plate 17 is preferably produced from an Alnico alloy, from oxidic permanent magnets, from magnetically coated PVC foils, or from magnets consisting of oxide powder and binder and manufactured in an injection molding operation.

In view of the fact that different synthetic plastic materials are used for the cassette parts 1 and 9, on the one hand, and for the components of the hinge 22, on the other hand, it is hardly possible to resort to adhesive bonding. Therefore, it is advantageous, as proposed by the present invention, when the hinge 22 (or the elongated rails 23 and 24) are simply slid over the corresponding portions 5 and 11 of the cassette parts 1 and 9. Here, it is advantageous when the rails 23 and 24 and the flexible band 25, which together constitute the hinge 22, are made of polypropylene and when they are made as a one-piece component in an injection molding or extruding operation. The hinge 22 is always situated at one generatix of the respective imaginary cylinder which represents the cylindrical pre-deformation of the respective cassette wall 2 or 10. The cassette parts 1 and 9 advantageously consist of acrylonitrile-butadiene-styrene polymers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A film cassette, especially for x-ray film, comprising a pair of cassette parts; hinge means connecting said cassette parts to one another for displacement between an open and a closed position; and means defining a film-accommodating space in the cassette including cooperating ribs on said cassette parts which at least partly bound said space, said ribs overlapping and being in shape-maintaining engagement with one another in said closed position, and each of said ribs having a pair of surfaces which are inclined relative to one another at a small angle so as to impart a wedge-shaped configuration to said ribs and cause the latter to be in said shape-maintaining engagement in said closed position.

2. The film cassette as defined in claim 1, wherein said ribs extend along rectangular courses around said space and are circumferentially complete.

3. The film cassette as defined in claim 1, wherein said ribs include at least one rib on one of said cassette parts and at least two ribs on the other of said cassette parts; and wherein said one rib is received between said two ribs in said closed position.

4. The film cassette as defined in claim 3, wherein said one cassette part constitutes a bottom and said other cassette part a top of said cassette.

5. The film cassette as defined in claim 1, wherein one of said cassette parts constitutes a bottom of the cassette; and wherein said cassette bottom includes a relatively thin cassette wall, and a frame rigid with and arranged at the periphery of said cassette wall.

6. The film cassette as defined in claim 5, wherein said frame includes an elongated projection arranged at the outer periphery of said frame and extending substantially parallel to said ribs.

7. The film cassette as defined in claim 6, wherein said projection has a lesser height at that side of the cassette where said hinge means is located than elsewhere; and wherein said frame includes means for mounting said hinge means on the outer periphery of said side.

8. The film cassette as defined in claim 6, wherein the other of said cassette parts constitutes a top of the cassette and includes an additional relatively thin cassette wall which is so mounted on said hinge means that a marginal zone thereof is juxtaposed with said projection of said cassette bottom in said closed position.

9. The film cassette as defined in claim 8, wherein said marginal zone of said additional cassette wall contacts said projection of said cassette bottom in said closed position.

10. The film cassette as defined in claim 1, wherein one of said cassette parts constitutes a bottom and the other cassette part a top of the cassette; and wherein said cassette top includes an external wall, a plurality of elongated projections on the inwardly facing surface of said external wall, and a plate supported on said projections at a distance from said external wall.

11. The film cassette as defined in claim 10, wherein said elongated projections extend diagonally of said inwardly facing surface of said external wall.

12. The film cassette as defined in claim 10, wherein said cassette top further includes a magnetized plate having multiple poles supported on said first mentioned plate and an intensifying shield covering said magnetized plate; and wherein said cassette bottom includes a thin foil of ferromagnetic material received in said space.

13. The film cassette as defined in claim 12, wherein said ferromagnetic material is steel.

14. The film cassette as defined in claim 12, wherein said cassette bottom further includes a support wall, and means for floatingly supporting said foil on said support wall and, including a narrow strip of elastic material interposed between said support wall and said foil.

15. The film cassette as defined in claim 14, wherein said strip is situated at the marginal portion of said foil.

16. The film cassette as defined in claim 1, wherein said hinge means includes two elongated rails each having a longitudinally extending undercut groove, and a flexible band interconnecting said rails; and wherein each of said cassette parts includes a profiled projection received in a respective one of said grooves.

17. The film cassette as defined in claim 16, wherein said grooves and said profiled projections have substantially identical cross sections.

18. The film cassette as defined in claim 16, wherein said hinge means includes a one-piece hinge member of deformable material incorporating said rails and said band.

19. The film cassette as defined in claim 18, wherein said deformable material is polyethylene.

20. The film cassette as defined in claim 18, wherein said flexible band has a part-cylindrical cross section so as to urge said cassette parts toward the open position thereof.

21. The film cassette as defined in claim 1, wherein said cassette parts comprise synthetic plastic material.

22. The film cassette as defined in claim 21, wherein said synthetic plastic material is a polycarbonate.

23. The film cassette as defined in claim 21, wherein said synthetic plastic material is a polystyrene.

24. The film cassette as defined in claim 23, wherein said polystyrene is an acrylonitrile-butadiene-styrene polymer.

25. The film cassette as defined in claim 1, wherein at least one of said cassette parts is of an elastic material and has a part-cylindrical cross section as considered in a plane normal to said hinge means.

26. The film cassette as defined in claim 1, wherein at least one of said cassette parts is of a material which is permeable to x-rays.

27. The film cassette as defined in claim 1, wherein said ribs bound said space substantially entirely.

28. The film cassette as defined in claim 1, comprising releasable locking means for holding said cassette parts in said closed position.

29. The film cassette as defined in claim 1, wherein said angle is between about 1° and 5°.

30. A film cassette, especially for x-ray films, comprising a cassette part which constitutes a bottom of the cassette and a cassette part which constitutes a top of the cassette, said cassette top including an external wall, a plurality of elongated projections on the inwardly facing surfaces of said external wall and a plate supported on said projections at a distance from said external wall; hinge means connecting said cassette top and bottom to one another for displacement between an open and a closed position; and means for delimiting a film-accommodating space in the cassette including cooperating ribs on said cassette top and bottom which circumferentially bound said space and overlap one another in said closed position, said cooperating ribs comprising a pair of ribs on said cassette top which are arranged such that one rib of said pair is surrounded by the other rib of said pair, and said one rib and elongated projections having end faces which are located in substantially the same plane at least in said closed position, said plate extending over said end face of said one rib and terminating substantially in registry with the outer circumference of said one rib.

* * * * *